E. W. MOORE.
ASPARAGUS CUTTER.
APPLICATION FILED MAY 7, 1914.
1,137,777.
Patented May 4, 1915.
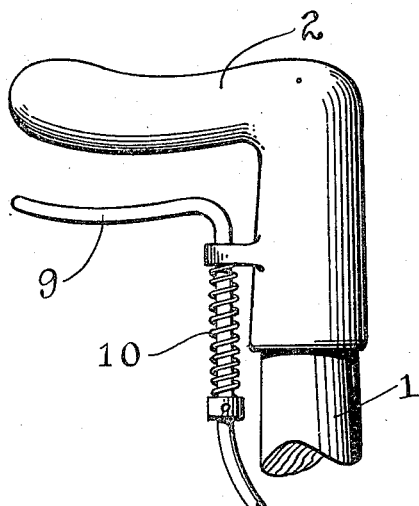
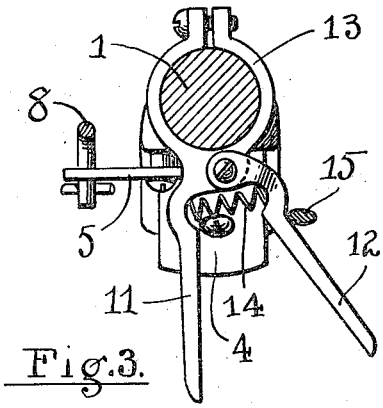
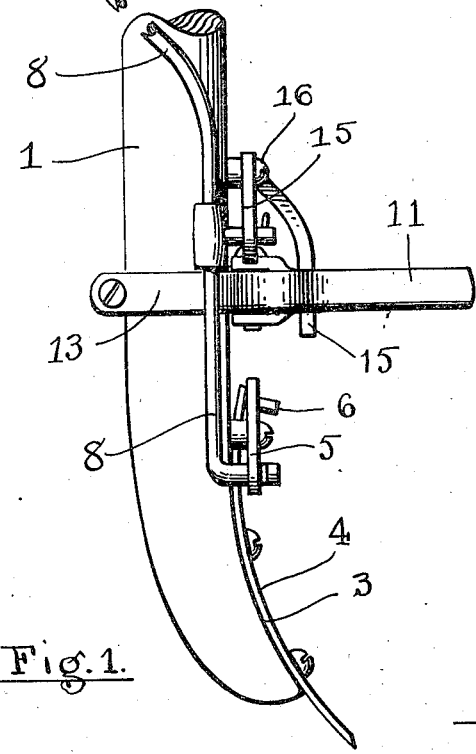
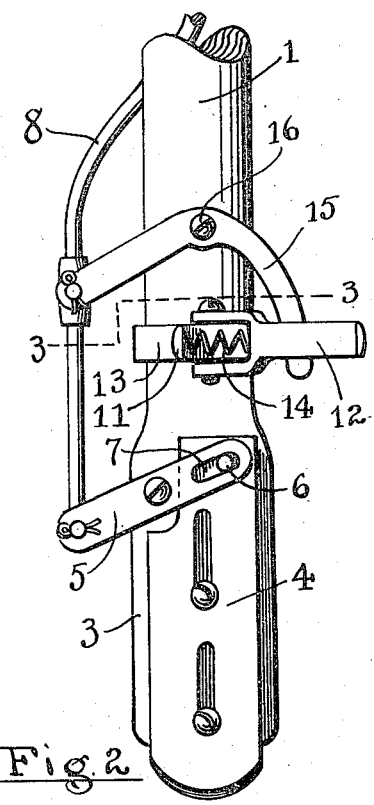
Witnesses
Inventor
Everett W. Moore
By Luther V. Moulton
Attorney

UNITED STATES PATENT OFFICE.

EVERETT W. MOORE, OF GRAND RAPIDS, MICHIGAN.

ASPARAGUS-CUTTER.

1,137,777. Specification of Letters Patent. Patented May 4, 1915.

Application filed May 7, 1914. Serial No. 836,903.

*To all whom it may concern:*

Be it known that I, EVERETT W. MOORE, a citizen of the United States of America, residing at Grand Rapids, in the county of Kent and State of Michigan, have invented certain new and useful Improvements in Asparagus-Cutters; and I do hereby declare the following to be a full, clear, and exact description of the invention, such as will enable others skilled in the art to which it appertains to make and use the same.

This invention relates to improvements in asparagus cutters, and its object is to provide a device which will be simple and cheap in construction; which will perform the delicate operation of cutting the asparagus stalks beneath the surface of the ground without injuring the same; to provide means by which the operation of cutting the asparagus may be performed while the operator is in a standing posture; to provide means for gripping and lifting the stalks after they have been severed, and to provide the device with various new and useful features hereinafter more fully described and particularly pointed out in the claims, reference being had to the accompanying drawings, in which:—

Figure 1 is a side elevation of a device embodying this invention, with a part broken out to shorten the figure; Fig. 2 is a front elevation of the lower end of the same; and Fig. 3 is a sectional plan on the line 3—3 of Fig. 2.

Like numbers refer to like parts in all of the figures.

1 represents the staff which is provided at its upper end with a handle 2 and the forward surface 3 of its lower end is curved and provided with a similarly curved cutting blade 4 so attached that it may be extended beyond the end of the staff to enter the earth and sever the asparagus stalks beneath the surface thereof.

The extensible cutter 4 is operated by means of a lever 5 pivotally attached near its center to the staff 1 and connected at one end to the cutter by means of a pin 6 which passes through a slot 7 in the lever and a rod 8 is attached to the opposite end of the lever 5 and this rod extends upward, being twisted partly around the staff to the rear side thereof and terminates in a hand grip 9 at its upper end which is adjacent the handle 2 and spaced apart therefrom sufficiently so that it may be raised to operate the lever 5. A spring 10 normally thrusts the rod 8 downward thereby holding the cutter 4 in retracted position.

A pair of gripping fingers 11 and 12 are located above the cutter for the purpose of gripping the asparagus stalks after they have been severed and lifting them from the ground, the finger 11 being a stationary one, preferably formed integral with the clamping ring 13 which surrounds the staff and is clamped thereon, and the finger 12 is pivotally attached to the said ring and moves relatively to the finger 11, being normally held away therefrom or in open position by means of the spring 14. A bell crank lever 15 pivoted to the staff at 16 engages the pivoted finger 12 at one of its ends and its other end is connected to the rod 8 and actuated thereby so that the movement of the rod 8 will operate simultaneously the extensible cutter 4 and the gripping finger 12.

To operate this device, the lower end of the staff with the cutter 4 projecting slightly beyond it, is placed against the surface of the ground near the asparagus stalk to be cut, and the open gripping fingers 11 and 12 are arranged to embrace the said stalk. The rod 8 is then raised by means of the portion 9, which operates the lever 5 and extends the cutter 4 into the earth and by virtue of its curved shape it will move toward the stalks and sever the same from the roots and at the same time the finger 12 will be moved toward the finger 11 to grip the stalks as they are cut and they may then be lifted and placed into a convenient receptacle. By releasing of the gripping member 9, the fingers 11 and 12 separate and release the stalks and the cutter returns to retracted position.

What I claim is:—

1. An asparagus cutter, comprising a staff having an extensible cutter at its lower end, gripping fingers on the staff above the cutter, and means for simultaneously actuating the cutter and gripping fingers from the upper end of the staff.

2. An asparagus cutter, comprising a staff having a curved surface near its lower end, a correspondingly curved extensible cutter traversably mounted on said surface, gripping fingers on the staff above the cutter, and means for simultaneously actuating the cutter and fingers from the upper end of the staff.

3. An asparagus cutter, comprising a staff, an extensible cutter at the lower end of the staff, a stationary and a pivoted gripping finger above the cutter, a pivoted lever attached at one end to the cutter, a pivoted bell crank engaging the pivoted finger with one end and a rod attached to the free ends of said lever and bell crank and extending near the upper end of the staff.

4. An asparagus cutter, comprising a staff having a curved surface near its lower end and a handle at its upper end, a curved extensible cutter traversably mounted on said curved surface, a lever pivoted to the staff and connected at one end to said cutter, a fixed finger and a pivoted finger above the cutter, said fingers being normally separated by a spring, a bell crank pivoted to the staff and engaging the pivoted finger with one end, a rod attached to the respective free ends of the said lever and bell crank and extending near the said handle, and a spring to yieldably move the rod downward to release the gripping finger and retract the cutter.

In testimony whereof I affix my signature in presence of two witnesses.

EVERETT W. MOORE.

Witnesses:
PALMER A. JONES,
MAE RANKIN.